(12) United States Patent
Novoplanski et al.

(10) Patent No.: US 7,743,858 B2
(45) Date of Patent: Jun. 29, 2010

(54) UNMANNED ROBOT VEHICLE WITH MOBILITY ENHANCING ARM

(75) Inventors: Avishay Novoplanski, Moshav Beit Zait (IL); Stefan Hodis, Haifa (IL)

(73) Assignees: Elbit Systems Ltd, Haifa (IL); Galileo Mobility Instruments Ltd., Lod (IL)

( * ) Notice: Subject to any disclaimer, the term of this patent is extended or adjusted under 35 U.S.C. 154(b) by 0 days.

(21) Appl. No.: 11/984,473

(22) Filed: Nov. 19, 2007

(65) Prior Publication Data

US 2008/0184840 A1 Aug. 7, 2008

(30) Foreign Application Priority Data

Feb. 7, 2007 (IL) .................................... 181208

(51) Int. Cl.
*B62D 55/04* (2006.01)
(52) U.S. Cl. ....................... 180/9.32; 180/8.4
(58) Field of Classification Search ............. 180/8.3, 180/8.4, 9.32, 8.5
See application file for complete search history.

(56) References Cited

U.S. PATENT DOCUMENTS

| | | | | | |
|---|---|---|---|---|---|
| 960,059 | A | * | 5/1910 | Williams | 180/8.4 |
| 992,211 | A | * | 5/1911 | Kohn | 180/8.4 |
| 1,592,654 | A | * | 7/1926 | Bremer | 180/9.32 |
| 2,012,090 | A | * | 8/1935 | Straussler | 180/9.32 |
| 2,378,945 | A | * | 6/1945 | Otzmann | 180/9.32 |
| 3,204,714 | A | * | 9/1965 | Gray | 180/6.7 |
| 3,357,510 | A | * | 12/1967 | Jourdan | 180/7.5 |
| 3,489,236 | A | * | 1/1970 | Goodwin | 180/8.1 |
| 4,534,431 | A | * | 8/1985 | Aronsson | 180/9 |
| 4,671,369 | A | * | 6/1987 | Tiffin et al. | 180/8.1 |
| 4,854,408 | A | * | 8/1989 | Beard et al. | 180/9.32 |
| 4,915,184 | A | * | 4/1990 | Watkins | 180/8.2 |
| 5,137,101 | A | * | 8/1992 | Schaeff | 180/8.1 |
| 5,513,716 | A | * | 5/1996 | Kumar et al. | 180/8.3 |
| 6,161,639 | A | * | 12/2000 | Jones | 180/8.4 |
| 6,422,329 | B1 | * | 7/2002 | Kazerooni et al. | 180/19.3 |
| 6,431,296 | B1 | | 8/2002 | Won | |
| 6,619,414 | B2 | * | 9/2003 | Rau | 180/9.32 |
| 2008/0179115 | A1 | * | 7/2008 | Ohm et al. | 180/9.21 |

FOREIGN PATENT DOCUMENTS

JP 60176871 A * 9/1985

OTHER PUBLICATIONS

International Search Report and Written Opinion in Application No. PCT/IL08/00162 mailed Oct. 3, 2008.
Lewis P. J., Flann N. S., Torrie M. R., Poulson E. A., Petroff T. "Chaos an Intelligent Ultra-Mobile SUGV: Combining the Mobility of Wheels, Tracks, and Legs" *SPIE Conference on Unmanned Ground Vehicle Technology VI*, Defense and Security Symposium., Orlando, FL, Apr. 2005.
http://www.irobot.com - printout of download on Feb. 4, 2010.
http://www.allen-vanquard.com/home/ - printout of download on Feb. 4, 2010.
http://www.foster-miller.com/ - printout of download on Feb. 4, 2010.
htip://www.mesa-robetics.com/matilda.html - printout of download on Feb. 4, 2010.

* cited by examiner

*Primary Examiner*—Kevin Hurley
(74) *Attorney, Agent, or Firm*—Pearl Cohen Zedek Latzer, LLP

(57) ABSTRACT

A vehicle (for example an unmanned robot vehicle) which includes a main body provided with a main locomotion mechanism for traveling over a terrain. The device is provided with at least one arm for enhanced support and maneuverability, the arm pivotally attached to the main body. The arm is controllable and capable of being rotated to a position where the arm or at least a substantial portion of the arm is placed in contact with the terrain or obstacle, so as to provide support or leverage to the main body.

3 Claims, 12 Drawing Sheets

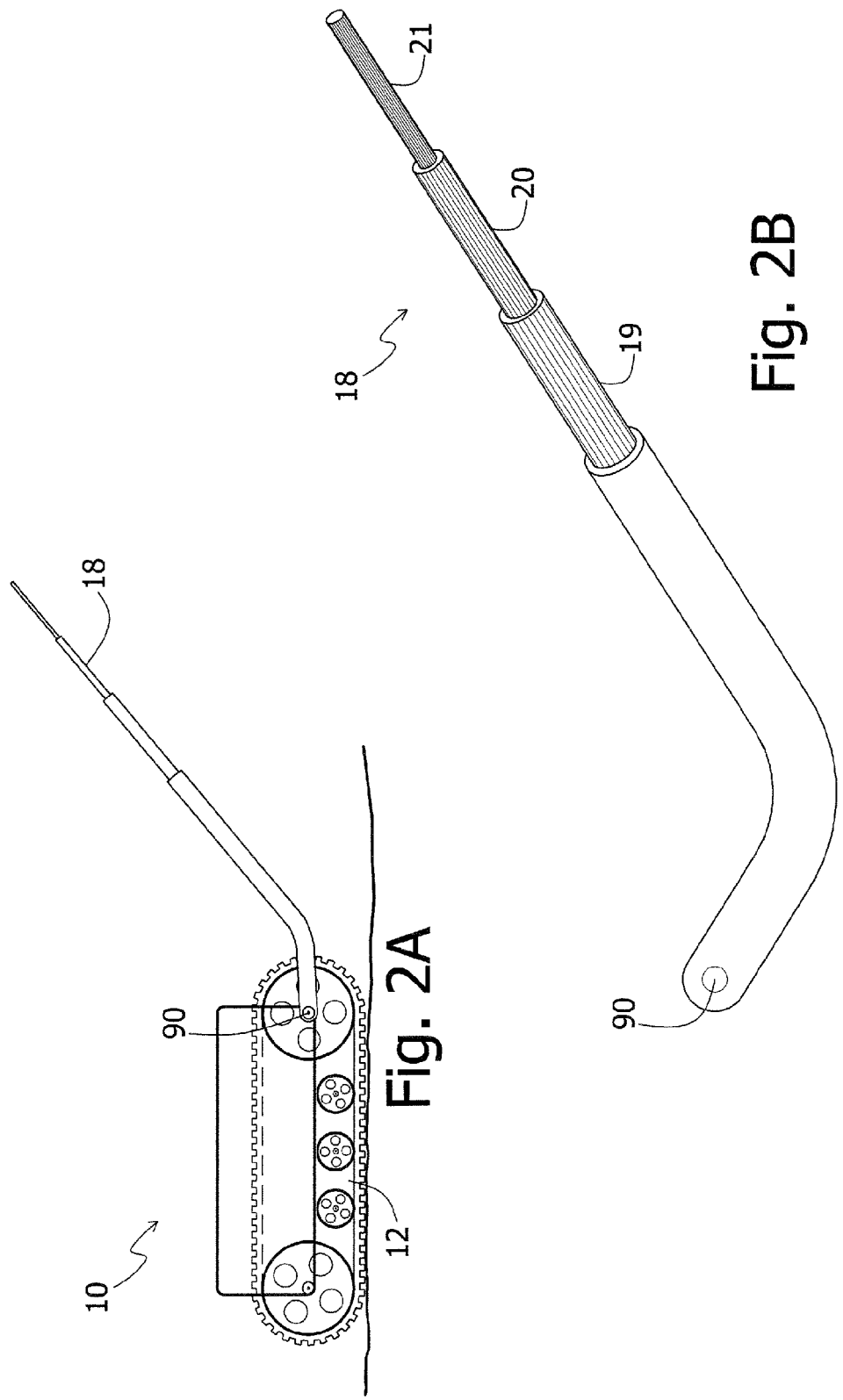

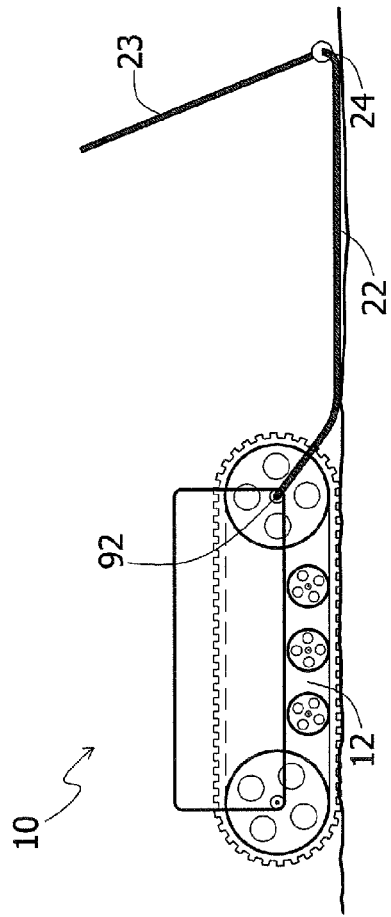
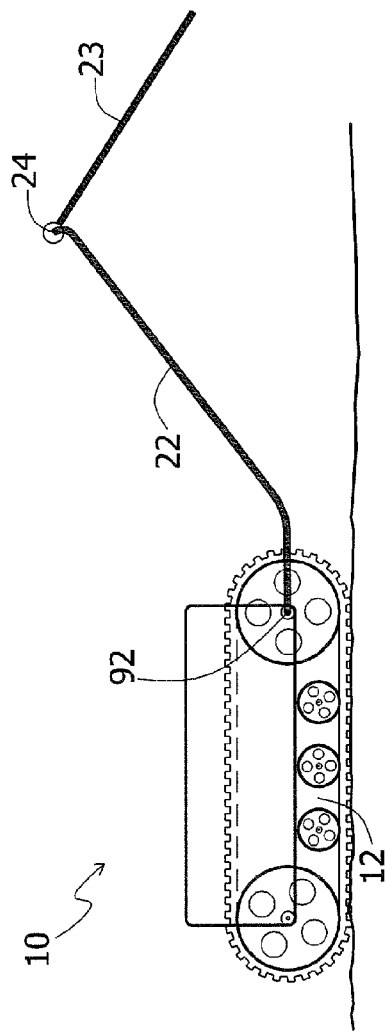
Fig. 3A
Fig. 3B

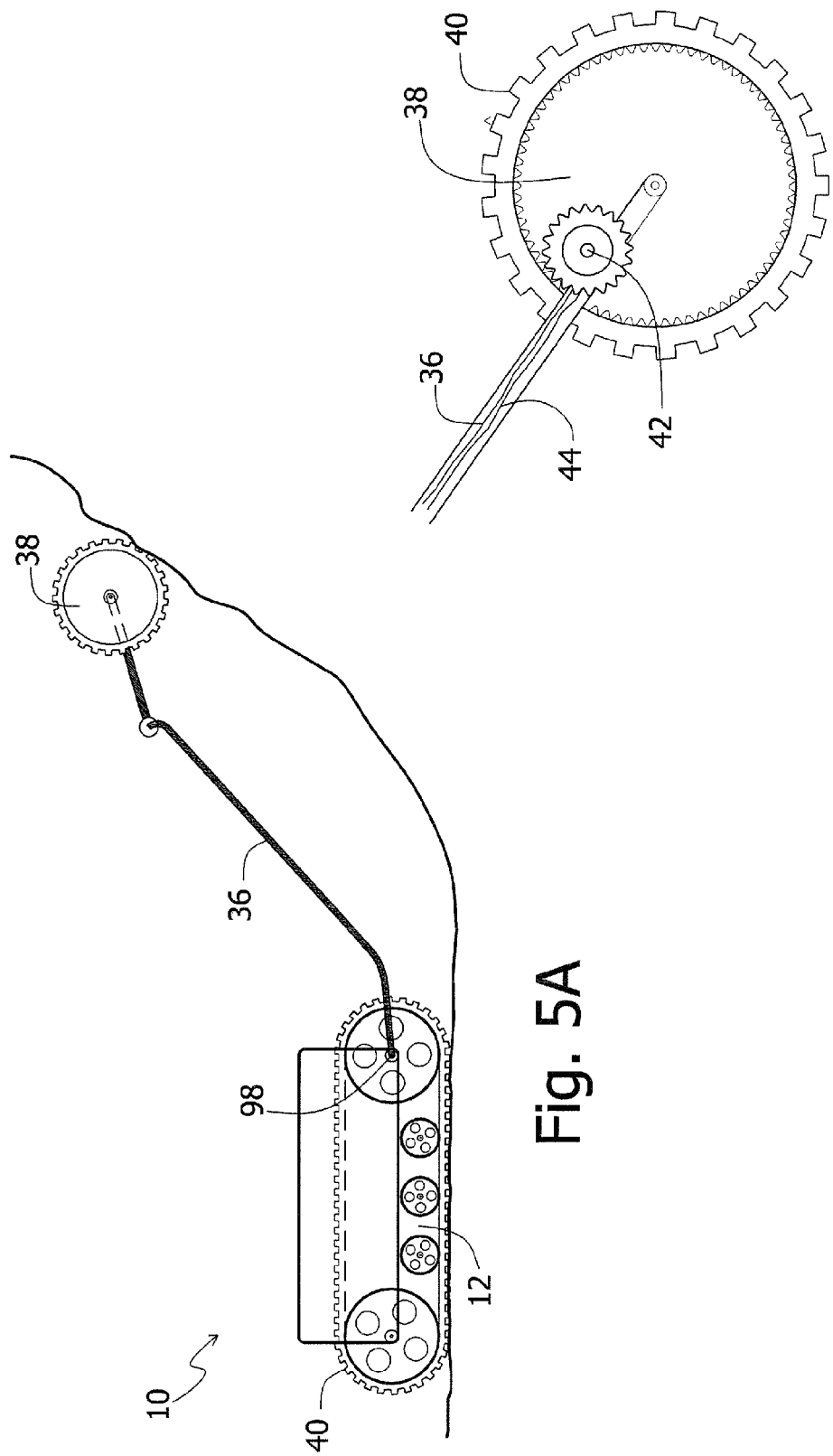

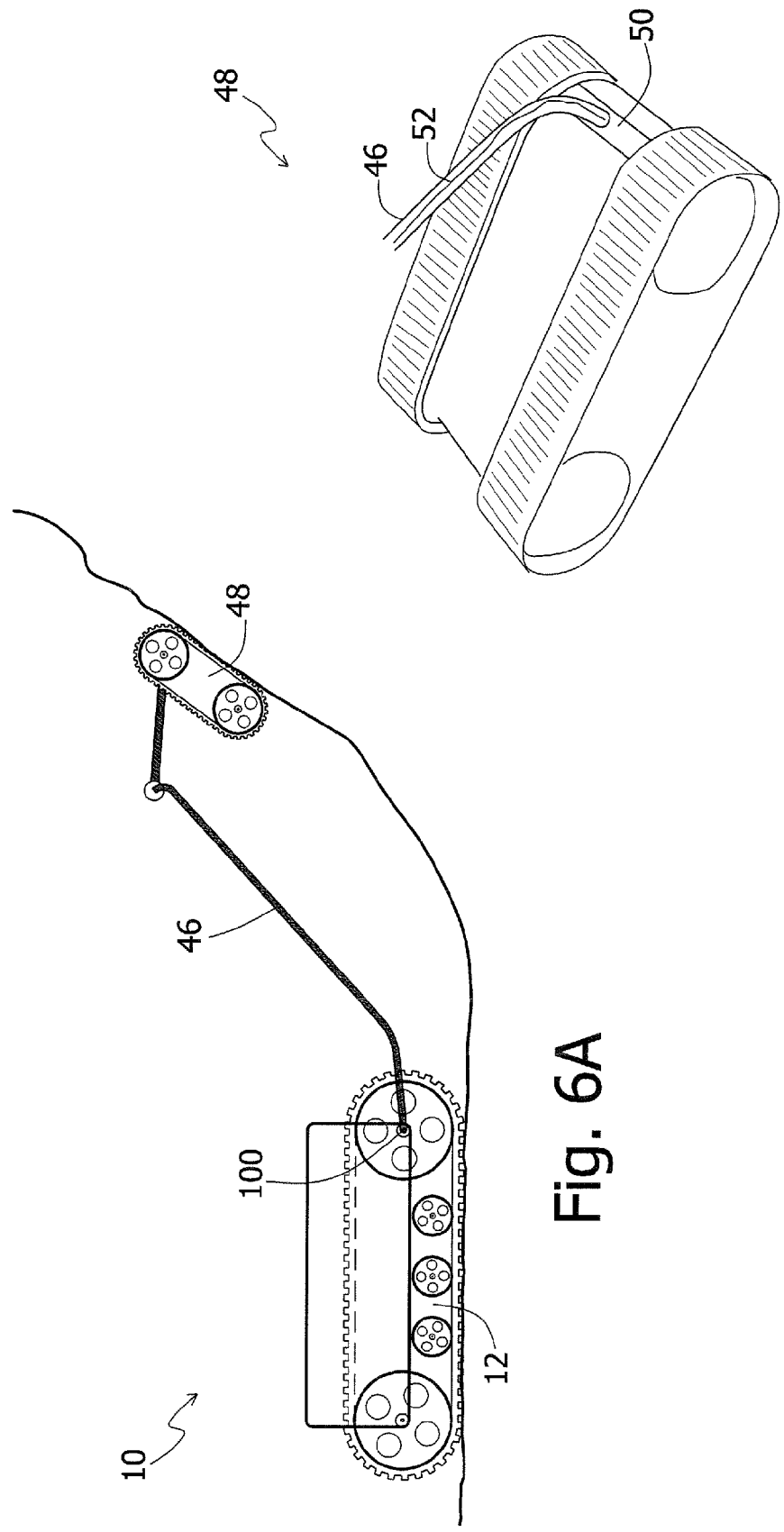

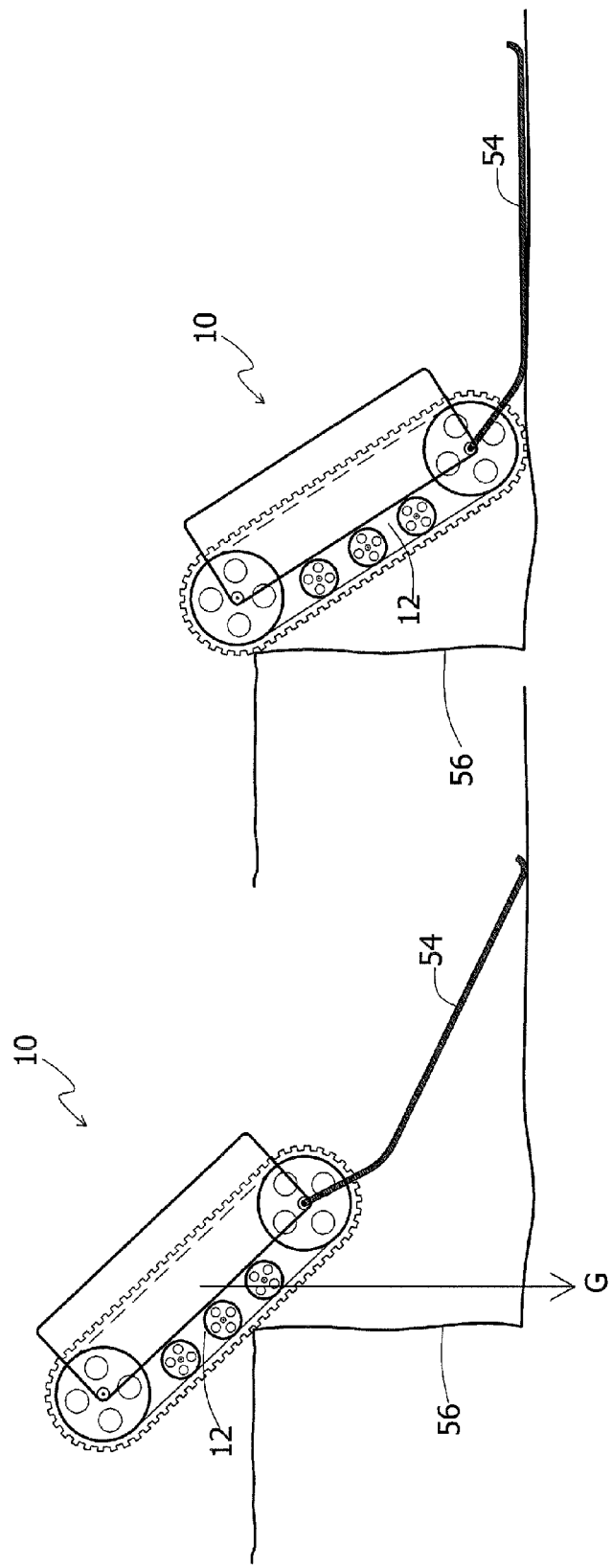

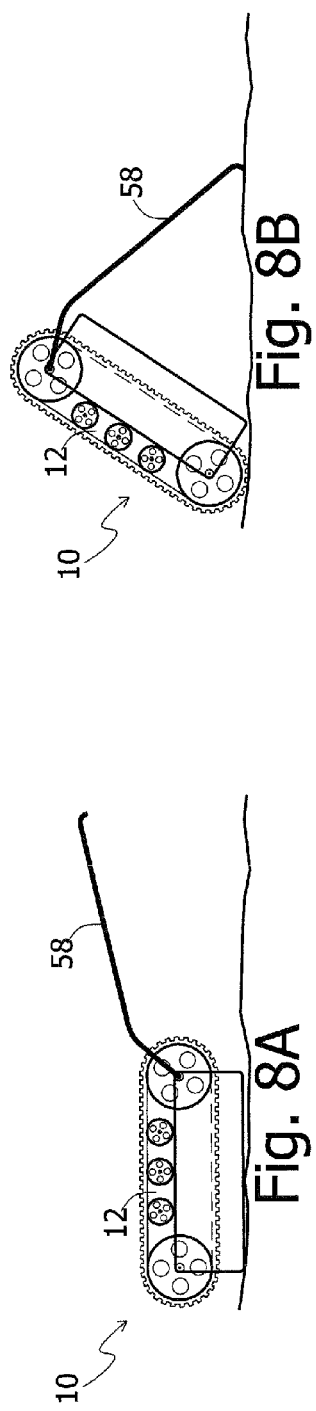
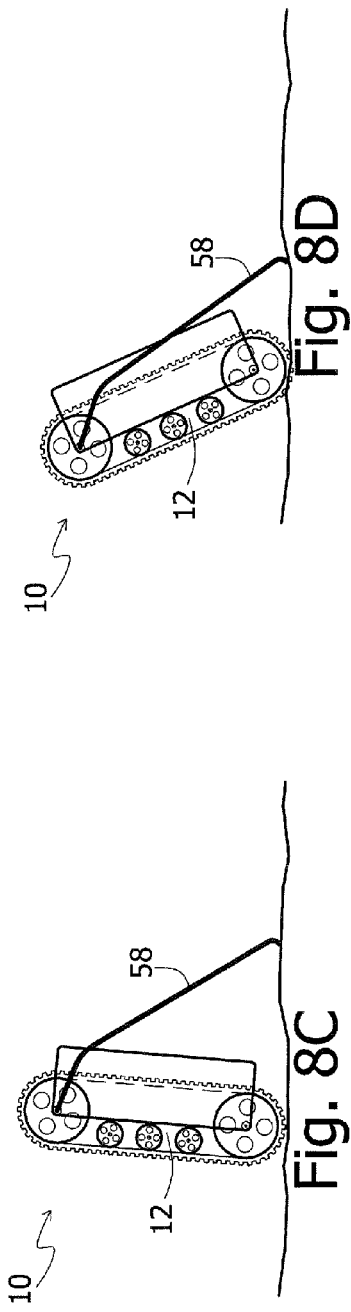
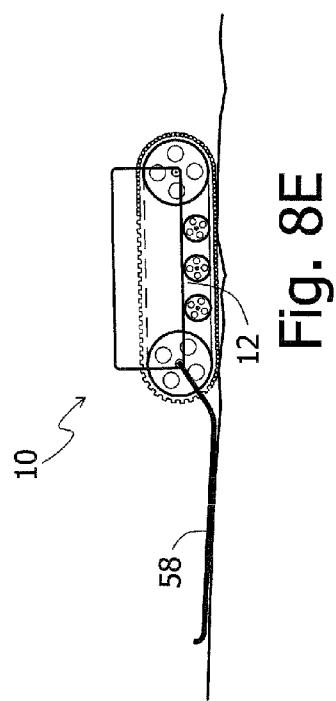

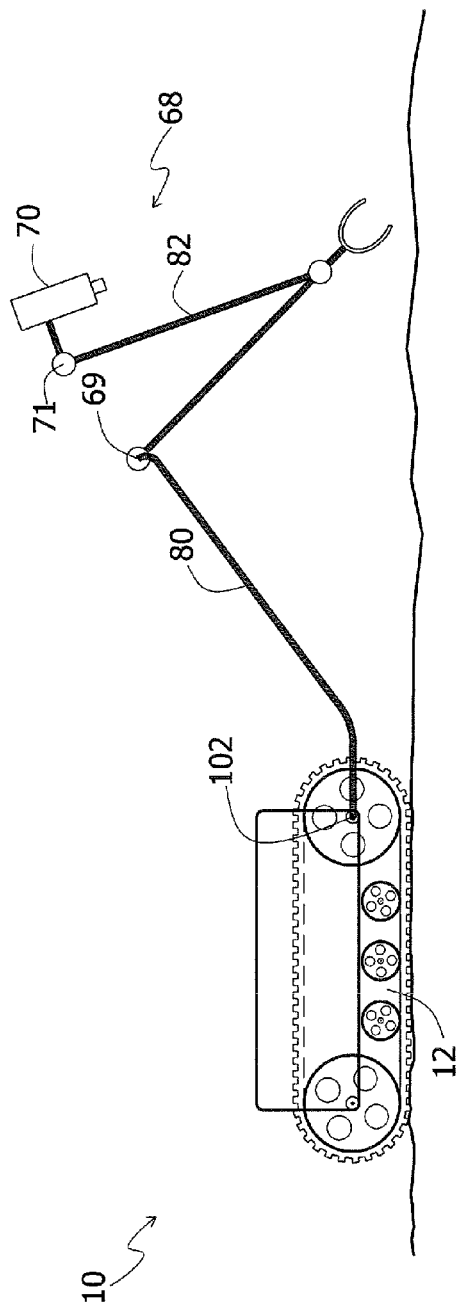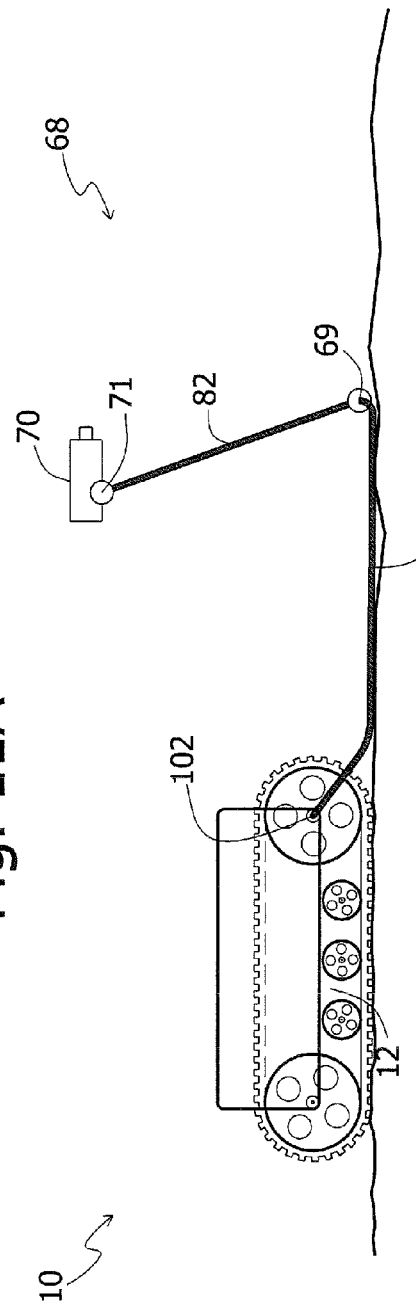
Fig. 11A
Fig. 11B

UNMANNED ROBOT VEHICLE WITH MOBILITY ENHANCING ARM

CROSS-REFERENCE TO RELATED APPLICATIONS

This application claims priority from Israeli Patent Application Number 181208, filed on Feb. 7, 2007, which is incorporated in its entirety herein by reference.

FIELD OF THE INVENTION

The present invention relates to vehicles. More particularly the present invention relates to a vehicle with an extended, remotely controlled, or autonomous mobile arm or rod. The arm provides improved maneuverability and ability to overcome obstacles in the path of the vehicle. In addition, the arm can serve as a flexible platform for carrying and remotely controlling various functional components such as a camera, gripper, fire extinguishing equipment, explosive ordinance disposal (EOD) tools, Geiger counter and other accessories carried aboard the platform of a vehicle.

BACKGROUND OF THE INVENTION

Small-unmanned robot vehicles (SURV) are autonomous or remotely operated ground vehicles designed to perform tasks in environments and locations that are either dangerous or inaccessible for humans to operate in, or are used for workload sharing with humans.

Given below is a very partial list of examples of environments and activities in which SURVs are employed:

- Search for survivors in collapsed structures following an earthquake, a fire or an explosion,
- Entry into highly radioactive contaminated areas,
- Assistance to law enforcement agencies in surveillance and control of violent demonstrations, unlawful gatherings and hostage situations,
- Assistance to law enforcement agencies entering unknown or potentially dangerous or hostile environments,
- Remote identification and neutralizing of bombs and dealing with suspicious objects and threats of terrorist activities,
- Exploration of extraterrestrial objects and territories such as the moon and Mars surveillance,
- Remote active monitoring of narrow pipes, tunnels and trenches.

In most activities of a SURV the maneuverability of the vehicle on a rough or difficult terrain is of crucial importance. To increase the utility of SURVs over a broad spectrum of operational conditions various locomotion systems have been designed. These designs include, inter-alia:

- Caterpillar tracks (hereinafter referred to as—tracks or track) in various configurations that enable good maneuverability on soft soil but are less efficient on hard flat surfaces,
- Wheels in various configurations that are efficient on hard and relatively flat surfaces and facilitate higher speeds on hard uncluttered surfaces but that are inefficient on loose and slippery ground conditions,
- Locomotion systems that can change from track configuration to wheel configuration and vice versa thus providing the advantage of both locomotion systems.

A detailed description of various SURV locomotion systems itemizing their advantages and disadvantages is given by Paul J. Lewis et al. in their article: "Chaos", an intelligent ultra-mobile small unmanned ground vehicle (SUGV): Combining the mobility of wheels, tracks and legs. The information is published on the Internet website: http://www.cs.usu.edu/~flann/chaos.pdf.

Since by definition SURVs are relatively small, regardless of the locomotion system employed they are limited in the size of obstacles they can overcome. This limitation is manifested by the relatively small gaps SURV can bridge and over-pass, the size of step they can mount and the steepness and inclinations they can climb in their advance-path.

Various mechanisms are employed to increase the ability of SURVs to overcome obstacles. An example of such a mechanism is the use of a track system provided with a frontal section presenting upward inclination that improves the SURV's attack-angle when confronting an obstacle, as seen in the design of the PackBot Explorer SURV, produced by the iRobot Corporation (website: http://www.irobot.com). Another example is the turning of rigid horizontal track-beams in a rotation motion, imitating wheels. The frontal tracks in this motion hold on to an obstacle in front of the SURV (such as stairs) and climb onto it. In yet another example of a mechanism to increase the ability to overcome difficult obstacles, the tracks of the SURV are converted to vertical "legs", enabling stepping over the obstruction. Paul J. Lewis et al., previously quoted, described an elaboration of the SURV turning track-beam systems and walking-legs mechanisms.

Various mechanisms are employed to overcome obstacles and improve the maneuverability of SURVs but the relatively small dimensions of the vehicles restrict the maneuverability in many environments and conditions. In addition, in many cases the employed locomotion mechanisms are difficult to operate autonomously, or to operate effectively by remote control.

When in use SURVs act as a platform for carrying specific equipment required for the designated task at hand. The effective operation depends in many cases on the ability to maneuver flexibly with the equipment. Examples include the ability to turn a video camera at various desired angles of photography or the use of a remote-controlled garbing-arm extended from the SURV, for picking up items adjacent the vehicle.

To increase the flexibility and operation span of a SURV, arms of various configurations have been developed and installed.

Examples of arm configurations are given in the description of three commonly used SURV: Vanguard MKII-T, made by Allen-Vanguard (web site: http://www.allen-vanguard.com/home/), by the Foster-Miller Talon III-B (web site: http://www.foster-miller.com/) and by the Mesa Matilda Block II (web site: http://www.mesa-robotics.com/matilda.html).

The arms in existing SURVs are designed so as to enable the flexible use of carried on equipment and not to extend the maneuverability of the SURVs.

It is an object of the present invention to provide SURVs with an extended arm or arms in order to increase the maneuverability of the vehicles.

SUMMARY OF THE INVENTION

There is thus provided, in accordance with some preferred embodiments of the present invention, an unmanned robot vehicle device comprising a main body provided with a main locomotion mechanism for traveling over a terrain, the device provided with at least one arm for enhanced support and maneuverability, the arm pivotally attached to the main body, controllable and capable of being rotated to a position where the arm or at least a substantial portion of the arm is placed in contact with the terrain or obstacle, so as to provide support or leverage to the main body.

Furthermore, in accordance with some preferred embodiments of the present invention, the arm is attached to the main body of the vehicle at a location on a bottom portion of the main body.

Furthermore, in accordance with some preferred embodiments of the present invention, the arm comprises a bar.

Furthermore, in accordance with some preferred embodiments of the present invention, the bar is curved.

Furthermore, in accordance with some preferred embodiments of the present invention, the arm comprises a segmented arm, having a plurality of joint segments, pivotally connected and adapted to be fixed in predetermined orientations.

Furthermore, in accordance with some preferred embodiments of the present invention, the arm comprises a telescopic arm.

Furthermore, in accordance with some preferred embodiments of the present invention, said at least one arm comprises two arms.

Furthermore, in accordance with some preferred embodiments of the present invention, said at least one arm comprises substantially parallel arms Furthermore, in accordance with some preferred embodiments of the present invention, the arm is provided with a secondary locomotion mechanism.

Furthermore, in accordance with some preferred embodiments of the present invention, the secondary locomotion mechanism comprises one or more wheel.

Furthermore, in accordance with some preferred embodiments of the present invention, the secondary locomotion mechanism comprises one or more caterpillar tracks.

Furthermore, in accordance with some preferred embodiments of the present invention, there is provided a method for stabilizing and for providing additional support and enhanced maneuverability over a ground to an unmanned robot vehicle device having a main body and provided with a locomotion mechanism, the method comprising a vehicle with at least one arm, the arm pivotally attached to the main body, and controllable, capable of being rotated to a position for support or leverage to the main body.

Furthermore, in accordance with some preferred embodiments of the present invention, the method further comprises fixing the arm in a predetermined position.

Furthermore, in accordance with some preferred embodiments of the present invention, the method further comprises pushing the arm against the ground.

Furthermore, in accordance with some preferred embodiments of the present invention, the arm is used to turn the vehicle device.

Furthermore, in accordance with some preferred embodiments of the present invention, the arm is used to extricate the vehicle out of a ditch or a trench.

Furthermore, in accordance with some preferred embodiments of the present invention, the arm is used to stabilize the vehicle when climbing one or more steps.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

FIG. 2A is a schematic illustration of a side view of a SURV with an extended telescopic arm shown with the arm in a lifted position.

FIG. 2B is a detailed schematic illustration of a periscope arm as shown on a SURV in FIG. 2A.

FIG. 3A is a schematic illustration of a side view of a SURV with an extended arm composed of two segments connected by a joint. The segment connected to the SURV pointing towards the ground, the second segment pointing skywards. Each segment's position can be individually or jointly controlled over 360 degrees (unless obstructed by the body of the robot).

FIG. 3B is a schematic illustration of a side view of a SURV with an extended arm composed of two segments connected by a joint. The segment connected to the SURV pointing skyward, the second segment pointing towards the ground.

FIG. 5A is a schematic illustration of a side view of a SURV with an extended arm having a locomotion wheel at its end to improve the maneuverability of the SURV over some terrain.

FIG. 5B is a detailed schematic illustration of a locomotion wheel as shown on a SURV in FIG. 5A. The locomotion wheel unit can comprise one or a plurality of wheels configured in parallel (not shown in a side view in FIG. 5A and FIG. 5B).

FIG. 6A is a schematic illustration of a side view of a SURV with an extended arm having caterpillar tracks at its end to improve the maneuverability of the vehicle over some terrain. The locomotion caterpillar track unit can comprise one or a plurality of caterpillar track configured in parallel (the number of caterpillar tracks not seen from a side view).

FIG. 6B is a detailed schematic illustration of a two parallel caterpillar tracks unit, as shown on a SURV in FIG. 5A.

FIGS. 7A and FIG. 7B are sequential schematic illustration side views of a (SURV either climbing or descending a high obstacle with the aid of an extended arm according to the present invention.

FIG. 8A through FIG. 8E are sequential schematic illustrations side views of a SURV rolling over from an overturned position with the aid on an extended arm according to the present invention.

FIG. 11A is a schematic illustration of a SURV with a vertically extended arm composed of two segments and having a video camera held by a gripper at its end.

FIG. 11B is a schematic illustration of SURV with an extended arm composed of two segments. The first segment pointing downwards and reaches the ground, the second pointing vertically and having a video camera held by a gripper at its end.

DETAILED DESCRIPTION OF PREFERRED EMBODIMENTS

Figure 1B:
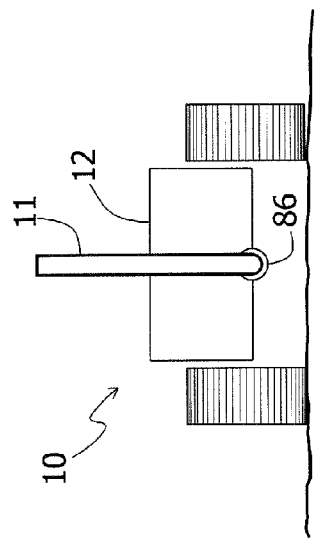
FIG. 1B is a schematic frontal view illustration of a SURV with a single extended arm shown with the arm in a lifted position.

A main object of the present invention is to substantially increase the maneuverability of small-unmanned robot vehicles (SURV) when confronting obstacles and difficult terrains. An arm, which is a part of the structural configuration of the SURV in accordance with the present invention, is designed so as to stretch or extend away from the SURV and be held fixed (at any desired angle) in a manner that forms a rigid and continuous supporting platform that extends beyond the dimensions of the tracks of the SURV. The arm prevents the SURV from rolling and falling on its back when encountering or tackling a high obstacle, or when maneuvering on an inclined surface. The motion of the arm is continuous and the arm can be stopped at any desired angle and remain fixed in that position. In a preferred embodiment of the present invention the arm is powered and controlled by a DC electric motor driven through an adequate standard ratio transmission gear. A power amplifier, driven by a standard DC motor controller, drives the motor. The gear is coupled to the arm axel by a worm gear that locks the arm in its position when the motor is not powered.

In some preferred embodiments the motion of the extended arm is driven by a hydraulic or hydraulic-pneumatic mechanism.

In some preferred embodiments of the present invention the length of the arm is approximately in the order of the length dimension of the SURV main body (particularly the distance between wheel axes), thus duplicating the length of the base and in climbing situations provides the needed extension to avoid the exiting of the Center of Gravity vector from the momentary foot print and avoiding the turning over of the vehicle.

In some preferred embodiments of the present invention the arm is composed of materials such as a metallic alloy, aluminum, polycarbonate or composite materials. The extension of the arm can be operated by a remote control or as a programmed autonomous response to a sensed condition and can be adjusted to be aligned in different angles with respect to the SURV, in accordance to the desire of the remote operator, according to a predetermined algorithm and depending on the limitations imposed by the obstacle. By presenting an extended and continuous rigid support platform the SURV can overcome relatively large gaps such as steps or trenches and climb over steep and relatively tall obstacles. Using this arm, the robot can lift itself, can overturn itself, can align its vertical attack angle, can bridge over a gap or can avoid being flipped over or inverted when climbing steep and high obstacles.

In addition, another purpose of the present invention is to utilize the extended arm that is part of the configuration of the SURV in accordance to the present invention for the remote-control maneuvering of equipment components carried aboard the SURV.

In a preferred embodiment of the present invention the extended arm that is part of the configuration of the SURV serve to stabilize and anchor the SURV in accordance to the SURV operating conditions and requirements at hand.

In a preferred embodiment of the present invention an arm is designed to be part of the configuration of the SURV.

In some preferred embodiments of the present invention the arm is constructed of segments that are pivotally jointed so as to enable folding and turning of the arm in a variety of three dimensional configurations. The flexibility of the arm, when used to anchor the SURV to the ground or when engaging an obstacle, can further enhance the maneuverability of the SURV, as previously described.

In other preferable embodiments of the present invention an arm that is part of the configuration of the SURV has a secondary locomotion unit such as a track-beam or a wheel attached to the arm thus substantially improving the maneuverability of the SURV in difficult terrain and in overcoming the overtaking of difficult obstacles.

In other embodiments of the present invention the arm that is designed to be part of the configuration of the SURV is made of a series of segments inserted in each other so that the arm can be extended to a desired length by a sliding telescopic motion of the segments.

In yet other preferred embodiments of the present invention the arm serves to carry and precisely maneuver various equipment components carried by the SURV such as a video camera, a gripper, a Geiger counter or other tools. The use of a segmented arm further improves the flexibility that is obtained in remote control maneuvering of various equipment components on board the SURV.

Reference is now made to the figures that are schematic illustrations of a SURV with an extended arm in accordance with some preferred embodiments of the present invention:

1 1A is a schematic illustration of a side view of a SURV 10 with caterpillar tracks 8, driven by wheels 9, having an extended arm 14 in the form of a bar, which is slightly curved, and which is pivotally attached to the main body of the SURV 12 by a pivot designated 85. The arm is shown in a horizontal position, substantially parallel to the ground, a substantial portion of the arm in contact with the ground. The arm is attached to the body of the SURV by a joint and is mechanically and continuously mobile and remotely controllable. Each joint has a 360-degree angular operating ability and includes a motor, gear, encoder, power amplifier and controller that enable the full control of the joint. The controller oversees the positioning of the segment, the velocity of movement, the torque applied and safeguards from crossing the mechanical ability limits of the segment. Moreover, each joint can include one or more adapters for specific tools to be mounted on the joint. The additions can include actuators and controller devices for operating and controlling those specific tools.

Figure 1C:
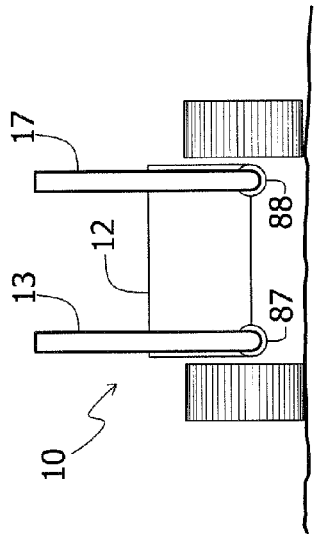
FIG. 1C is a schematic illustration of a frontal view of SURV with two parallel extended arms shown with the arms in a lifted position.
Figure 1A:
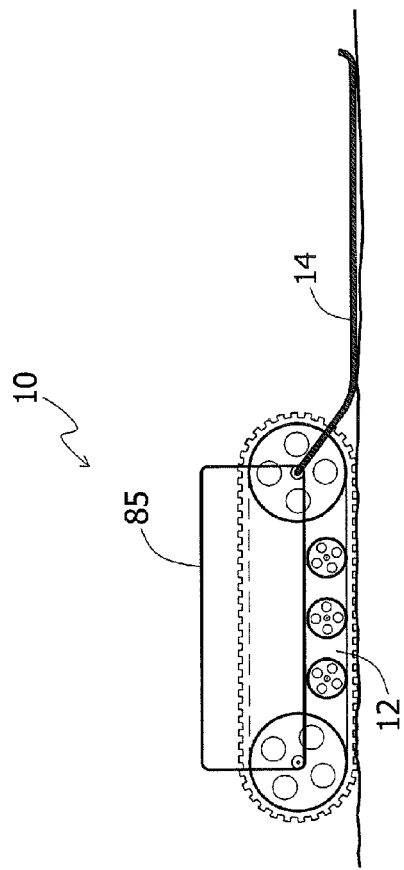
FIG. 1A is a schematic side view illustration of a small-unmanned robot vehicle (SURV) with an extended arm in accordance to the present invention, shown with the arm in a horizontal, position, a substantial portion of the arm being in contact with the ground.

In a preferred embodiment of the present invention, as shown in FIG. 1A, the extended arm 14 is attached by a pivot 15 at the lowest and most backward position of the main body of the SURV 12.

In another preferred embodiment the extended arm is attached by a pivot to the main body of the SURV at a position different than the most backward or lowered position shown in FIG. 1A.

FIG. 1B is a schematic illustration of a frontal view of a SURV 10 with a single extended arm 11 shown attached to the main body of the SURV 10 by a pivot 86 and in a vertical position.

FIG. 1C is a schematic illustration of a frontal view of a SURV 10 with two parallel extended arms 13 and 17 shown attached to the main body of the SURV 10 by pivots 87 and 88, respectively, and in a vertical position. In this embodiment the twin arm configuration renders the vehicle greater stability that the single arm configuration shown in FIG. 1B, yet the latter configuration may be preferable when considering operation in very narrow or limited spaces.

While in FIG. 1A the arm is shown to be external to the tracks of the SURV in a preferred embodiment the arm or arms are external to the tracks of the SURV, as shown in FIG. 1C.

FIG. 2A is a schematic illustration of a side view of a SURV 10 with an extended telescopic arm shown attached by a pivot 90 to the main body of the SURV 12 with the arm in an upright angular position. The telescopic arm offers an arm of a varying length, which may be desirable if the SURV is to be a multi-purpose tool operating the SURV in locations of substantially different dimensions.

FIG. 2B is a detailed schematic illustration of a telescopic arm 18 shown attached to a SURV in FIG. 2A and composed of a pivot 90 that connects to the main body of the SURV and three segments, 19, 20 and 21, which are interconnected by joints and which may be extended or retracted continuously to any desired length or any relative angle between the segments. The operation mechanism is typically electric, but can also be pneumatic operated or other mechanical mechanism.

FIG. 3A and FIG. 3B are both side view schematic illustrations of a SURV 10 with an extended arm attached by a pivot 92 to the main body of the SURV 12, the arm composed of two segments 22 and 23 and connected by joint 24. In FIG. 3A the segment connected to the SURV 22 points towards the ground, thus facilitating the mounting of some obstacle, while the second segment 23 points skywards in order to hold a camera or another device at a desired elevation. In FIG. 3B the segment connected to the SURV 22 points skyward, and the second segment 23 is tilted towards the ground, providing a fixed anchor into the ground.

Figure 4:
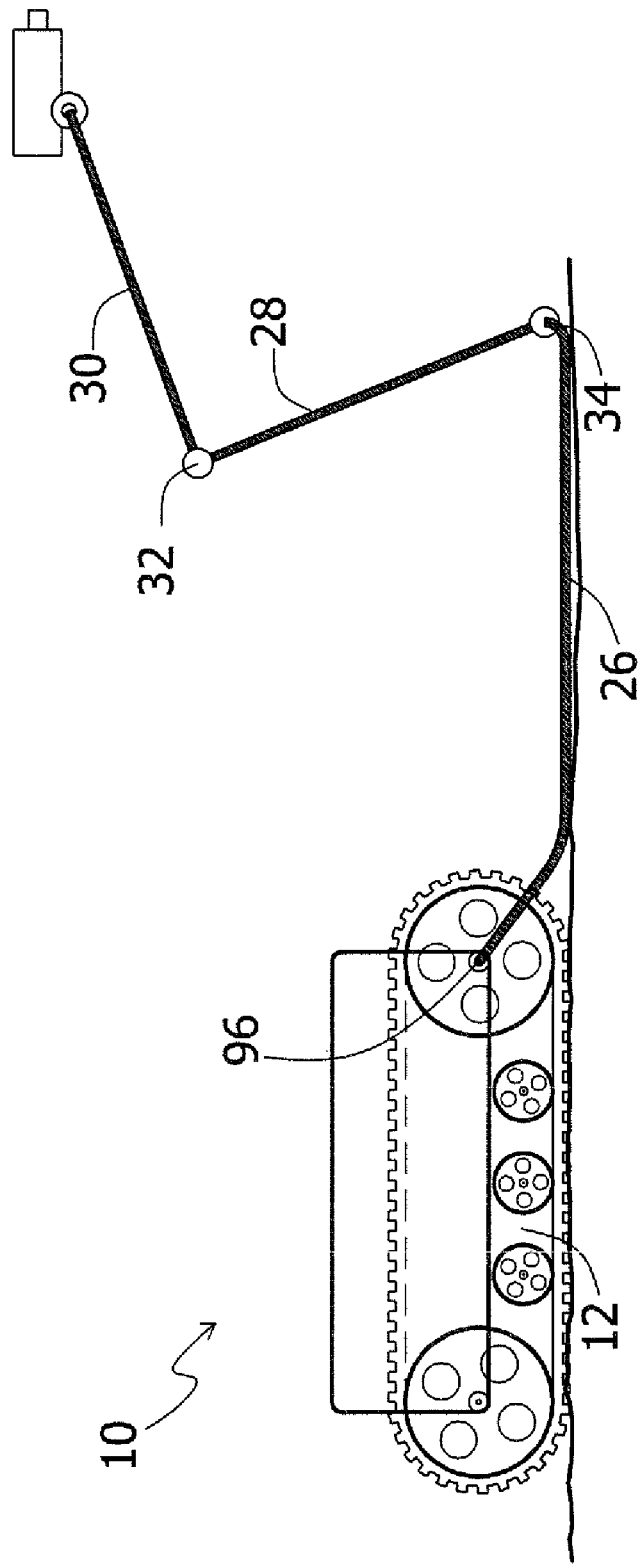
FIG. 4 is a schematic illustration of a side view of a SURV with an extended arm composed of three segments connected by two joints. Each segment's position can be individually or jointly controlled over 360 degrees (unless blocked by the robot body).

FIG. 4 is a side view schematic illustration of a SURV 10 having an extended arm attached by a pivot 96 to the main body of the SURV 12 and composed of three segments 26, 28 and 30 with the segments connected at joints 32 and 34. Shown in FIG. 4, is the segment connected to the SURV 26, pointing downwards and reaching the ground, the second segment 28 pointing skywards and the third segment 30 pointing frontward. The illustration shows a compound arm having two joints but there are no restrictions as to the number of joints that can be provided along the extended arm. The segment that reaches the ground 26, acts as an anchor and stabilizer for the SURV while the other segments 28 and 30 are not restricted in their operational maneuverability and may be used for other desired purposes. In addition, the segments of the arm, all or part of them can be designed to fold and deploy in a telescopic manner, so as to extend the length of the arm in accordance to specific needs. The structure of such a telescopic segment is illustrated in FIG. 2B. The pivotal joints allow the arm to assume a multitude of formations, thus facilitating a broad range of numerous flexible operations.

FIG. 5A is a schematic illustration of a SURV 10 with an extended arm 36 extending from the main body of the SURV 12 and connected by a pivot 98 having a secondary locomotion unit in the form of a wheel 38 at its end to confer driving force and improve the maneuverability of the SURV over rough terrain. The locomotion wheel is operated in coordination with the motion of the tracks of the SURV.

FIG. 5B is a detailed schematic illustration of the locomotion wheel 38 connected to the main body of the SURV 12 with an extension arm 36, as illustrated in full in FIG. 5A. The locomotion wheel has a rugged circumference configuration 40 for increased friction facilitating a firm grip of the terrain traveled over. The locomotion wheel is designed so as to have a driving mechanism 42 operated and commanded from the main body of the SURV and running through the extension arm 36. The operating and commanding components are designated as number 44.

FIG. 6A is a side view schematic illustration of SURV 10 with an extended arm 46 extending from the main body of the SURV 12, connected by a pivot 100 and having a caterpillar track 48 at its end to improve the maneuverability of the SURV over rough terrain. The caterpillar tracks are operated in coordination with the main tracks of the SURV.

FIG. 6B a detailed schematic illustration of the caterpillar tracks 48 connected to the main body of the SURV 12 with an extension arm 46, as shown in full in FIG. 6A. The track is configured to allow a firm grip of the terrain traveled over. The tracks are designed so as to have a driving mechanism 50 operated and commanded from the main body of the SURV and running through the extension arm 46. The operating and commanding components running through the extension arm are designated as number 52.

FIGS. 7A and 7B illustrate a sequence of schematic side view illustrations of a SURV 10 with a horizontality-stretched and extended arm 54 shown as it climbs or descends a steep and high obstacle 56. As seen in the schematic illustrations, the arm considerably extends the length dimension of the SURV thus providing support to the vehicle and preventing its turning over as it climbs or ascends obstacles which are considerably taller than the height of the vehicle. The Center of Gravity of the SURV, indicated as G, is shown to demonstrate the support extended by the extended arm 54.

FIG. 8A through FIG. 8E is a side view sequence of schematic illustrations of a SURV 10 completely rolled over from a full inverted position with the aid of an extended arm 58 attached to the main body of the SURV 12. Seen in the sequence of illustrations, the extension arm 58 gradually pushes the main body of the SURV 12 from an up-side down position, seen in FIG. 8A, through a vertical position, seen in FIG. 8C, to an up-right position, back on its tracks, seen in FIG. 8E.

Figure 9A:
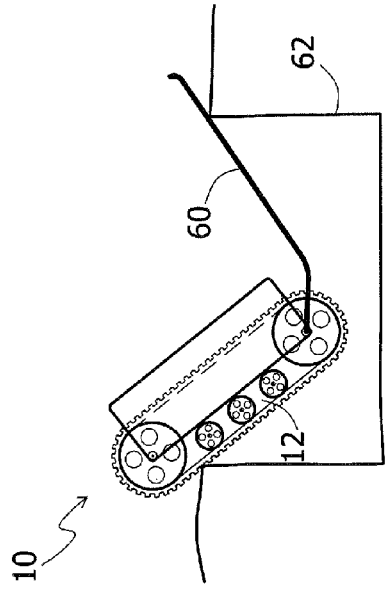
FIGS. 9A through 9D are side view schematic illustrations in sequence of a SURV climbing out of a trench according to the present invention.
Figure 9B:
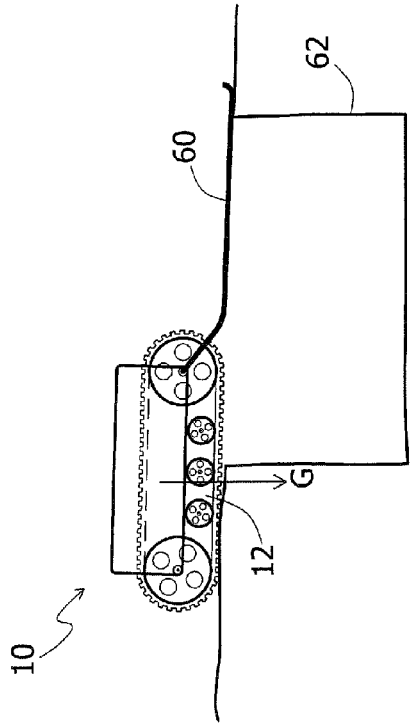
Figure 9C:
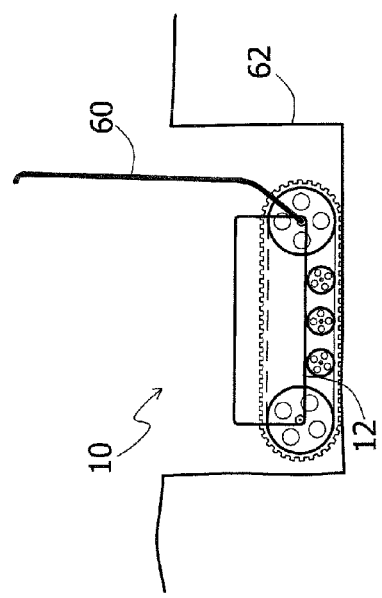
Figure 9D:
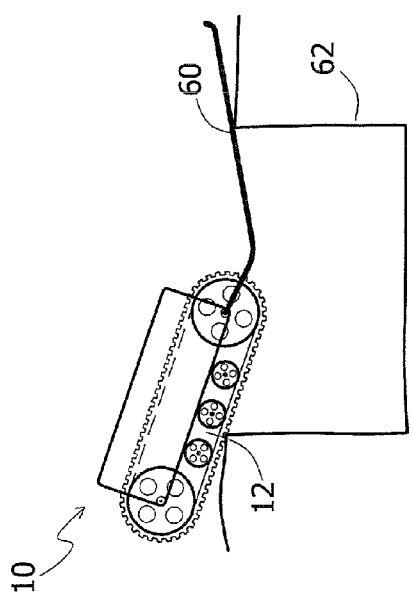

FIG. 9A through 9D is a sequence of side view illustrations of a SURV 10 climbing out of a trench 62 with the aid of an extended arm 60 attached to the main body of the SURV 12. FIG. 9A illustrates the approaching of the SURV to the wall of the trench 62. FIG. F9B and FIG. 9C illustrate stages in which the SUR gradually pulls out of the ditch by positioning the extended arm 60 to the edge of the ditch and gradually straightening the arm. The leverage derived by straightening the arm pulls the SURV upwards. FIG. 9D illustrates a situation in which the SURV has fully extended the arm 60 and by doing so has completely pulled out of the ditch 62. At this position the gravity vector, marked G in FIG. 9D, has cleared the edge of the ditch, marked as 63. The sequence of the schematic illustrations FIG. 9A to FIG. 9D can also be viewed in a reversal sequence from FIG. 9D to 9A, in which case the SURV is seen descending into a ditch with the aid of an extended arm.

Figure 10:
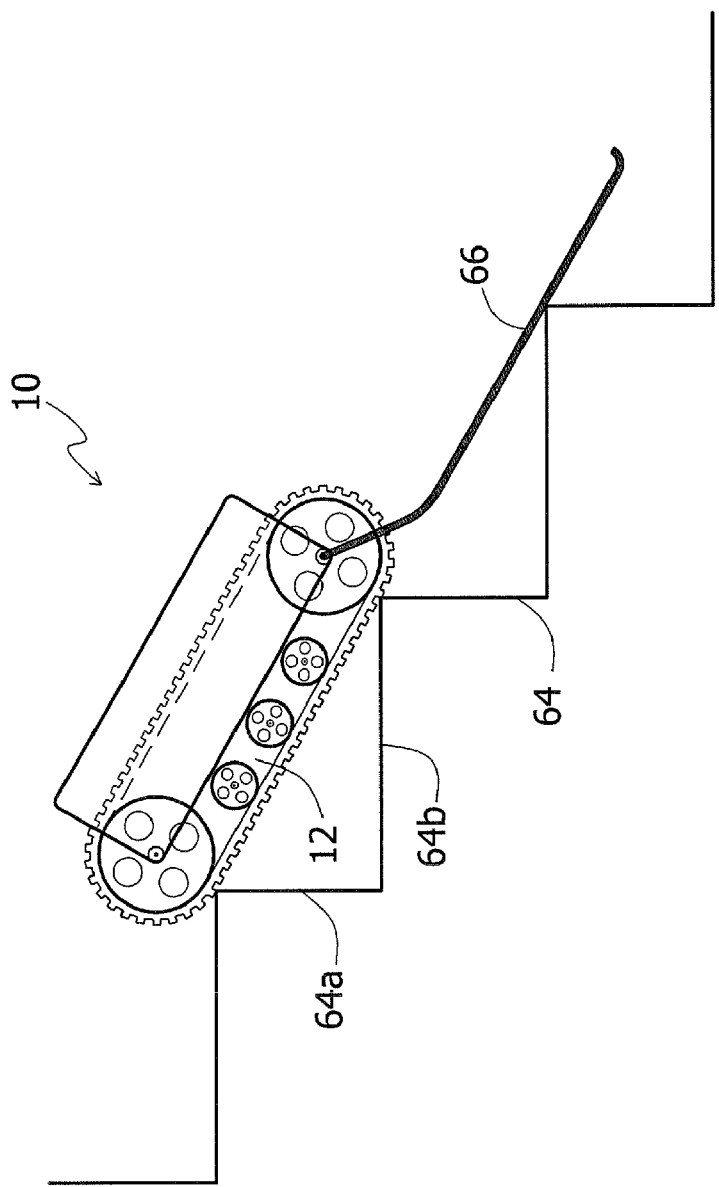
FIG. 10 is schematic illustration of a side view of a SURV climbing or descending stairs according to the present invention.

FIG. 10 is side view schematic illustration of a SURV 10 climbing or descending stairs 64. The extended arm 66 from the main body of the SURV 12 provides the SURV with maneuverability so as to allow the vehicle to travel or slide over the stairs without the difficulties of negotiating the outlines of the stairs.

To further clarify the climbing or descending of stairs by a SURV with an extended arm as shown in FIG. 10, in a preferable embodiment the height of a stair, designated 64a in FIG. 10 is 17 cm and the width a stair, designated 64b in FIG. 10, is 30 cm. In order to slide over stairs having the mentioned dimensions the total length of the SURV with the extended arm is at least 80 cm. If the length of the body of the SURV 12 is 50 cm and the length of the extended arm is 50 cm the SURV has no difficulty in traveling over the stairs.

FIG. 11A is a schematic illustration of a SURV with a vertically extended arm 68 connected to the main body of the SURV 12 by a pivot 102 and composed of two segments, 80 and 82, that are joint together by a pivot 69 and having a video camera 70 at its end and a gripper at it's mid joint 71. The combination of two pivotally connected segments improves the flexibility and maneuverability of controlling the held camera.

FIG. 11B is a schematic illustration of SURV with an extended arm 68 composed of two segments 80 and 82 that are joint together by a pivot 69. Segment 80 is pointed downwards and reaches the ground to anchor and stabilize the SURV. Segment 82 points vertically and has a video camera 70 at its end and a gripper at its mid joint 71.

Figure 12:
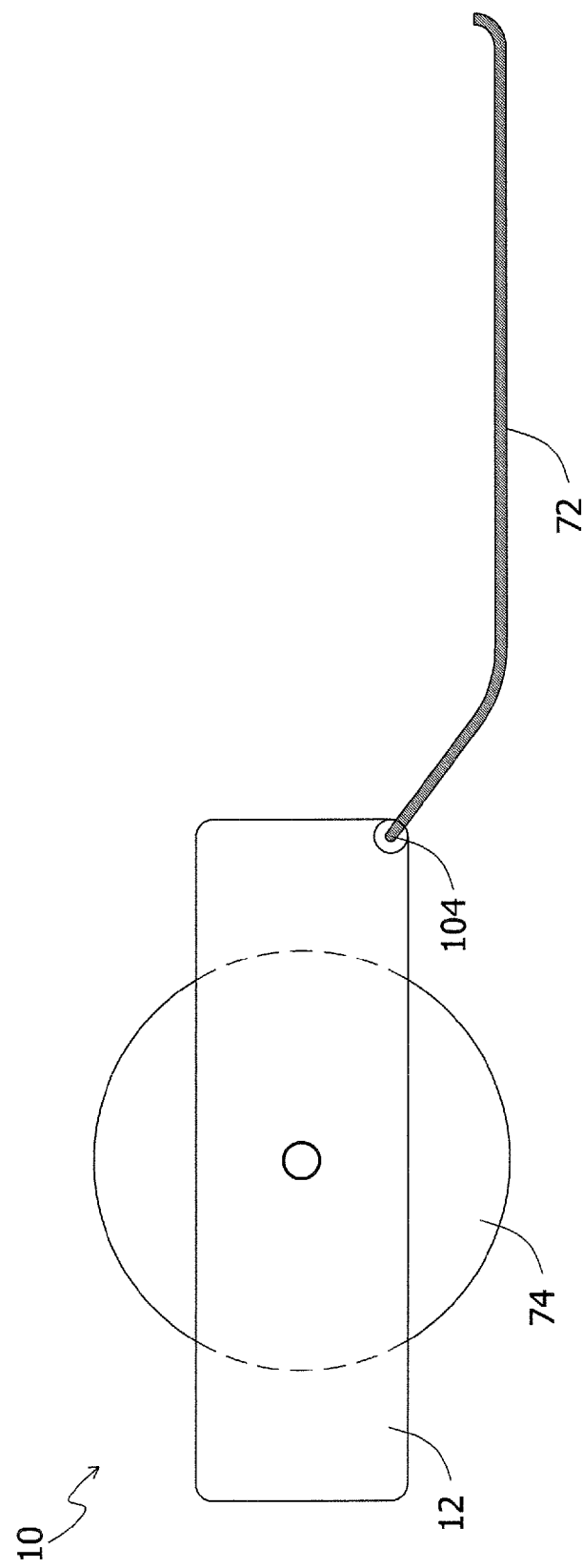
FIG. 12 is a schematic illustration of a side view of a SURV having an extended arm and a main wheel-locomotion system.

To emphasize that a SURV with and extended arm in accordance to the present invention can have various locomotion systems FIG. 12 is a schematic illustration of a side view of a SURV 10 having a wheel-locomotion system 74 and an extended arm 72 connected to the main body of the SURV by a pivot 104 and extending from the main body of the vehicle 12.

While the embodiments described hereinabove with reference to the figures relate to SURV it is clear that the present invention is not limited to SURV only and in fact any vehicle can be provided with a mobility enhancing arm in accordance with the present invention.

It should be clear that the description of the embodiments and attached figures set forth in this specification serves only for a better understanding of the invention, without limiting its scope.

It should be clear that the embodiments shown in the figures and discussed herein serve as examples only and in no way limit the scope of the present invention.

It should also be clear that a person skilled in the art, after reading the present specification could make adjustments or amendments to the attached figures and above described embodiments that would still be covered by the present invention.

The invention claimed is:

1. A vehicle device comprising:
    a main body provided with a main locomotion mechanism for traveling over a terrain or obstacle,
    at least one motor-powered arm pivotally attached to an end portion of the main body, said arm controllable, rotatable and lockable in at least one of a number of angles, so that in one of said at least one of a number of angles the arm form a rigid, continuous support for the main body, the arm being aligned with a surface of the terrain on which the main body is supported when the vehicle device travels over the terrain, wherein the arm is attached to the main body of the vehicle at a location on a bottom portion of the main body.

2. A vehicle device comprising:
    a main body provided with a main locomotion mechanism for traveling over a terrain or obstacle,
    at least one motor-powered arm pivotally attached to an end portion of the main body, said arm controllable, rotatable and lockable in at least one of a number of angles, so that in one of said at least one of a number of angles the arm form a rigid, continuous support for the main body, the arm being aligned with a surface of the terrain on which the main body is supported when the vehicle device travels over the terrain, wherein the arm is curved.

3. A vehicle device comprising:
    a main body provided with a main locomotion mechanism for traveling over a terrain or obstacle,
    at least one motor-powered arm pivotally attached to an end portion of the main body, said arm controllable, rotatable and lockable in at least one of a number of angles, so that in one of said at least one of a number of angles the arm form a rigid, continuous support for the main body, the arm being aligned with a surface of the terrain on which the main body is supported when the vehicle device travels over the terrain, wherein the length of the arm is at least substantially equal to the length of the main body.

\* \* \* \* \*